(12) United States Patent
Tooman

(10) Patent No.: US 8,555,518 B2
(45) Date of Patent: Oct. 15, 2013

(54) GROUT TEMPLATE FOR WIND TURBINE FOUNDATIONS

(76) Inventor: Norman Tooman, Bakersfield, CA (US)

( * ) Notice: Subject to any disclaimer, the term of this patent is extended or adjusted under 35 U.S.C. 154(b) by 0 days.

(21) Appl. No.: 13/475,846

(22) Filed: May 18, 2012

(65) Prior Publication Data

US 2012/0291394 A1  Nov. 22, 2012

Related U.S. Application Data

(60) Provisional application No. 61/487,670, filed on May 18, 2011.

(51) Int. Cl.
*E04G 21/18* (2006.01)
*E02D 27/42* (2006.01)

(52) U.S. Cl.
CPC ............ *E04G 21/185* (2013.01); *E02D 27/425* (2013.01)
USPC .............................. 33/645; 52/295; 52/741.15

(58) Field of Classification Search
USPC ......... 52/295, 699, 741.15, 247; 33/518, 613, 33/624, 625, 644, 645; 249/3, 4, 5, 6, 7
See application file for complete search history.

(56) References Cited

U.S. PATENT DOCUMENTS

| | | | | |
|---|---|---|---|---|
| 2,887,756 | A * | 5/1959 | Brechel | 249/13 |
| 3,171,185 | A * | 3/1965 | Anderson | 249/34 |
| 3,458,184 | A * | 7/1969 | Schlosser | 269/287 |
| 3,990,672 | A * | 11/1976 | Buchanan | 249/48 |
| 4,003,541 | A * | 1/1977 | Lanier | 249/18 |
| 4,121,804 | A * | 10/1978 | O'Leary | 249/187.1 |
| 5,015,117 | A * | 5/1991 | Pawlicki | 403/300 |
| 5,120,162 | A * | 6/1992 | Parker | 405/229 |
| 5,374,121 | A | 12/1994 | Draenert | |
| 5,836,132 | A * | 11/1998 | Weathersby | 52/702 |
| 7,707,797 | B2 | 5/2010 | Henderson | |
| 8,079,566 | B1 * | 12/2011 | Hurst | 249/34 |
| 2002/0000076 | A1 | 1/2002 | Goeku | |
| 2009/0044482 | A1 | 2/2009 | Tooman | |
| 2009/0158680 | A1 | 6/2009 | Jolly | |
| 2010/0284759 | A1 | 11/2010 | Clarke | |
| 2011/0131899 | A1 * | 6/2011 | Voss et al. | 52/173.1 |

\* cited by examiner

*Primary Examiner* — Michael Safavi
(74) *Attorney, Agent, or Firm* — James M. Duncan, Esq.; Klein DeNatale Goldner

(57) ABSTRACT

A method of forming a grout trough for a wind turbine foundation replaces the heavy and single piece template with a plurality of arc-shaped sections which are light weight and connected together to form the grout trough. The individual sections include mechanisms which enable the sections to be removed from the cured concrete by rotation of nuts on the anchor bolts which either pushes or pulls the template section away from the contact with the cured concrete. An embodiment of an individual section has a lifting bale which may be used to pick up an entire bolt package of up to twenty bolts.

1 Claim, 21 Drawing Sheets

GROUT TEMPLATE FOR WIND TURBINE FOUNDATIONS

CROSS-REFERENCE TO RELATED APPLICATIONS

U.S. Provisional Application No. 61/487,670 for this invention was filed on May 18, 2011, for which application this inventor claims domestic priority.

BACKGROUND OF THE INVENTION

This invention relates to concrete foundations set within excavations or bore holes which are installed to support wind turbines. More particularly, this invention comprises an apparatus and method for configuring, installing, and setting the anchor bolts for a cylindrical foundation for a wind turbine, and installing a grout trough in the foundation.

U.S. Pat. Nos. 5,586,417 and 5,826,387, both by Henderson, disclose a foundation "which can be poured-on-site monolithically and is of cylindrical construction with many post-tensioned anchor bolts which maintain the poured portion of the foundation under heavy compression, even during periods when the foundation may be subject to high overturning moment." Henderson's foundation is preferably in the shape of a cylinder, having an outer boundary shell and an inner boundary shell each formed of corrugated metal pipe. Between the outer boundary shell and the inner boundary shell elongated high strength steel bolts extend vertically up through concrete from a peripheral anchor plate, called an inbed plate, located near the bottom of the cylinder. The bolts extend upwardly from the inbed plate to a connecting plate or flange above the ground surface. The bolts extend through hollow tubes to prevent adhesion of the concrete to the bolts. The foundation typically uses no rebar reinforcing steel. This design uses the mechanical interaction with the earth to prevent over turning instead of the mass of the foundation typically used by other foundations for tower structures. FIG. 1 schematically shows an embodiment of the Henderson foundation.

The "hollow tubes" of this foundation are typically elongated plastic tubes which encase the bolts substantially through the entire vertical extent of the concrete and allow the bolts to be tensioned after the concrete has hardened and cured, thereby post-tensioning the entire concrete foundation. Alternatively, the elongated bolts can be wrapped in plastic tape, or coated with a suitable lubrication, which will allow the bolts to stretch under tension over the entire operating length of the bolt through the vertical extent of the concrete.

Henderson further discloses the post-stressing of the concrete in great compression by tightening the high strength bolts to provide heavy tension between a heavy top flange and the inbed plate at the bottom of the foundation, thereby placing the entire foundation under high unit compression loading. The bolts are tightened so as to exceed the maximum expected overturning force of the turbine tower on the foundation. Therefore, the entire foundation withstands various loads with the concrete always in compression and the bolts always in static tension.

The tensioning bolts in the cylindrical foundation are preferably in side-by-side pairs, the pairs extending radially from the center of the foundation, forming an inner ring of bolts and an outer ring of bolts as shown in FIG. 2. As shown in FIG. 2, the inner ring of bolts defines a circle having a slightly shorter diameter than a circle defined by the outer ring of bolts. The bolt pattern is, of course, determined by the bolt pattern on the mounting flange of the turbine tower to be installed on the foundation. A large number of bolts in typically used for this type of foundation. Typically seventy tensioning bolts are used in the inner ring and seventy tensioning bolts in the outer ring for a total of one hundred forty bolts. In Henderson's foundation, the lower ends of the bolts are anchored to the inbed plate at the bottom of the foundation which may be constructed of several circumferentially butted and joined sections.

The following known procedure is typically followed in constructing the cylindrical foundation. A bore hole is drilled or excavated and an outer boundary shell of corrugated metal pipe ("CMP") is set within the hole. Bolt bundles are lowered into the borehole. The bolt bundles typically comprise about thirty bolts, with each bolt weighing up to two hundred pounds per bolt. Workers are lowered into the CMP lined bore hole. Working from the bottom of the bore hole, the workers lift and/or position each individual bolt so it can be inserted into a template at the surface, which is suspended above the bore hole by a crane having a capacity of approximately 100 tons. Once each bolt is inserted into the template, a nut made up onto the threads extending above the template, such that the weight of each bolt is suspended by the template.

Once all of the bolts have been suspended from the template, the entire assembly is lifted out of the bore hole so the inbed plates may be placed at the bottom end of the bolts. As the assembly is lowered back into the bore hole, bands or rebar wraps are placed around the collective bolts to hold the bolts in position when the concrete is poured after the assembly is in position. FIG. 3 shows such an assembly suspended by a lifting frame which is connected to the template. The entire assembly is then lowered back into the bore hole and an inner boundary shell of CMP is lowered into the bore hole such that the bolts are extending upwardly through an annulus defined by the outer boundary shell and the inner boundary shell.

A jig assembly is erected as generally depicted in FIG. 4 which suspends the lifting frame, the grout template, and all anchor bolts within the bore hole. Concrete is poured into the annulus around the upwardly extending bolts, with the template at the top of the bolts used to form a "grout trough" in the upper surface of the concrete. The upwardly facing ends of the bolts extend into the grout trough and, following the hardening of the concrete, the grout trough is filled with a high strength grout upon which the tower flange is placed when the grout has adequately cured.

The above procedure has a number of disadvantages. For example, it requires the utilization of a very heavy jig assembly to support the extremely heavy template for leveling the template. This jig assembly requires heavy equipment to mobilize and demobilize. In addition, once the concrete has set and the grout trough formed, the template must be freed from the concrete. However, the template may substantially adhere to the concrete and heavy equipment and pry bars are often required to pry the template free. In addition, because the template supports the weight of all of the foundation bolts, each bolt must be secured to the template with a nut, thereby requiring substantial time to install the nuts. A large crane is required for lifting and suspending the bolt-template assembly, which weighs a number of tons.

SUMMARY OF THE INVENTION

Embodiments of the method and apparatus disclosed herein provide a solution to the disadvantages described above. For purposes of this disclosure, the phrase "downwardly facing end" when referencing a bolt refers to the end of a bolt facing downward within a bore hole and the phrase "upwardly facing end" refers to the end of a bolt facing upward within the bore hole.

An embodiment of the apparatus is utilized in combination with a method of installing bolt packages, and the bolt packages themselves, which have been previously disclosed by the present inventor, among other places, in U.S. Pat. No. 8,146,323. The following steps are taken in preparation for utilizing the present apparatus and method. First, a foundation bore hole is installed according to Henderson or other method. Thereafter, bolt packages are assembled and installed according to the '323 patent. The total number of tower flange bolts to be utilized for the foundation is divided into a plurality of groups. Each of the bolts is encased within a hollow tube or other encasement ("sleeve") which allows movement of the bolt relative to the sleeve once the bolt and sleeve are set within a concrete foundation. Each group of bolts is assembled into a bolt package where each bolt package comprises a plurality of bolts, where each bolt is either encased within a sleeve or wrapping to allow motion of the bolt with respect to the sleeve or wrapping. Within each bolt package, each bolt is retained, by position retention means, in a position, with respect to the position of adjacent bolts, which is substantially the same position as when the bolt package is later placed within the foundation bore hole. The downwardly facing ends of the bolts of each bolt package are attached to an arc-shaped in-bed plate having holes for an inner arc of bolts and an outer arc of bolts. Each assembled bolt package may thereafter be individually placed within the bore hole. The bolt packages are arranged such that the inner arc of bolts of each anchor bolt package form an inner circle of upwardly facing anchor bolts and the outer arc of each bolt package form an outer circle of upwardly facing anchor bolts.

The number of bolts in each bolt package will generally be about ten to twelve bolts. Of course this number may vary according to various design and installation factors, without changing the basic concept of the embodiments of the method and apparatus disclosed herein.

Because the present method does not require the template to support the collective weight of all of the anchor bolts, the lighter weight template of the present invention may be utilized for the formation of the grout trough and not every bolt needs to have a nut attached to the template at the upwardly facing end of the bolt. A template according to the present invention is very light relative to the known template. The pieces comprising the template of the present invention may be easily transported within the back of a small truck, with the individual template sections manually handled into the truck bed. In contrast, the known templates are extremely heavy and require relatively heavy equipment for loading and transportation.

In the present invention, the template for the grout trough comprises a number of sections which are fit together to form an enclosure, typically circular, for the grout trough. The sections comprise means for raising the section with respect to the upwardly facing bolts of the foundation, thereby allowing each section to be freed from the underlying concrete without the need for a crane or pry bar. For example, in one embodiment, the means for raising the arc-shaped section from the underlying concrete is a bracket, or brackets, attached to the upwardly facing surface of each arc-shaped section, where each bracket has at least one aperture into which the end of an upwardly facing anchor bolt is received. A nut on the upwardly facing anchor bolt (placed prior to placement of the arc-shaped section) underlies the bracket. Rotation of the nut in a direction which lifts the nut upwardly on the threads of the anchor bolt causes the nut to engage the underside of the bracket, thereby lifting the arc-shaped section from the concrete as rotation of the nut continues.

Alternatively, the arc-shaped section may also comprise a lifting bale which may be utilized in combination with an arc-shaped section. The lifting bale provides a bracket portion similar to that described above, where one or more nuts beneath the bracket section may be utilized to lift the arc-shaped section from the concrete. The lifting bale is constructed of structural steel members and capable of supporting the weight of a completed bolt package because the lifting bale attaches directly to the anchor bolts. Thus, this embodiment provides a competent lift point for lifting and positioning completed bolt packages, and also provides a mechanism for lifting the arc-shaped section from the concrete.

The means for raising the arc-shaped section in a third embodiment comprises a plurality of spacer tube-nut assemblies, such as four assemblies per arc-shaped section. Each spacer tube is welded to the top surface of the arc-shaped section. Each nut member comprises a bushing member depending from a nut body, where the bushing member comprises a slot. A sectioned washer or comparable structure is thereafter utilized to attach the nut member to the spacer tube, which allows the nut member to spin with respect to the spacer tube. The spacer tube-nut assemblies fit over some of the upwardly facing anchor bolts. The nuts of each arc-shaped section may thereafter be rotated on the upwardly facing anchor bolts to either position all of the arc-shaped sections at the correct level, or to lift the arc-shaped section from the concrete surface.

Because the arc-shaped sections are not used for lifting bolt packages, each arc-shaped section may be fabricated from light and easily handled material. In addition, the surfaces of the arc-shaped sections may be coated with polytetrafluoroethylene such as, for example, Teflon® to prevent adherence to the concrete. Once the concrete is sufficiently set, the nuts may be rotated in the appropriate direction to easily break each arc-shaped section free from the concrete, thereby eliminating any need for pry bars and heavy equipment.

BRIEF DESCRIPTION OF THE DRAWINGS

FIG. 9A shows a detailed view of how the lattice assembly in FIG. 8 may be attached to the bolt sleeves.

DETAILED DESCRIPTION OF THE EMBODIMENTS

Figure 1:
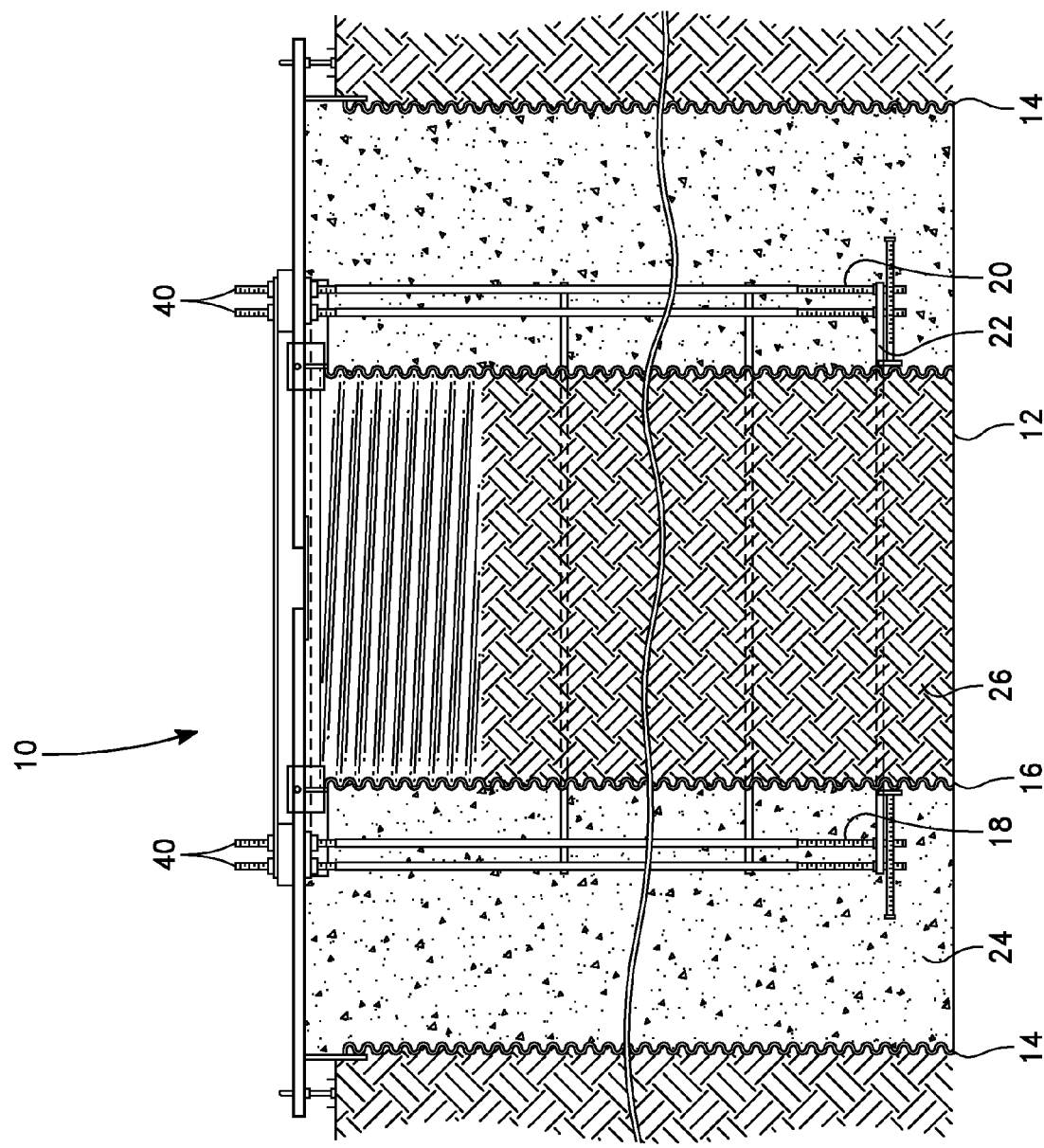
FIG. 1 shows the foundation of Henderson following installation of the anchor bolts.

Referring specifically to the figures, FIG. 1 depicts an embodiment of a known foundation 100 utilized for installation of a relatively tall vertical structure, such as a wind turbine. It is to be appreciated that while the disclosed method and apparatus may be utilized to obtain a foundation 10 such as that depicted in FIG. 1, the procedure for obtaining the foundation is entirely different from the known methods. Foundation 10 comprises a bore hole 12, an outer boundary shell 14 and an inner boundary shell 16, each typically fashioned of corrugated metal pipe ("CMP"), set within the bore hole hole. An inner ring 18 of bolts 40 and an outer ring 20 of bolts 40 are disposed within the annulus formed between the outer boundary shell 14 and the inner boundary shell 16, with the bolts 40 anchored at the lower end of the bore hole 12 to an inbed plate 22. The annulus between the outer boundary shell 14 and the inner boundary shell 16 is filled with concrete 24 and the portion of the bore hole 12 inside the inner boundary shell 16 typically filled with loosely compacted soil 26.

Figure 2:
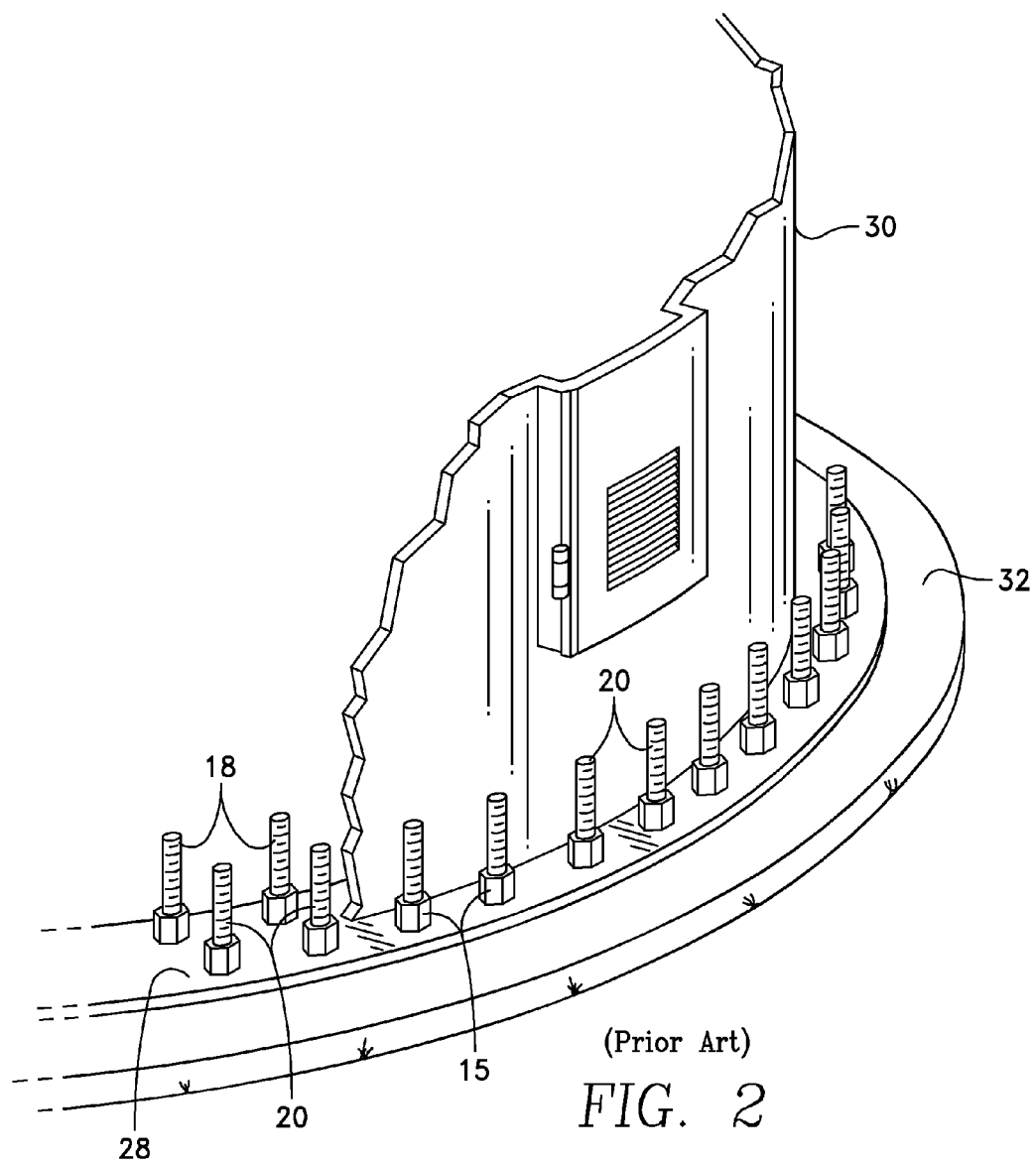
FIG. 2 shows a completed foundation, showing an inner ring of anchor bolts and an outer ring of anchor bolts with a tower flange attached.

FIG. 2 depicts a typical surface view of a wind turbine base, showing the inner ring 18 of bolts 40 and the outer ring 20 of bolts 40 extending through a base flange 28 of a wind turbine tower 30 set upon a base 32 formed by concrete 24, with nuts 15 securing the base flange to the bolts.

Figure 3:
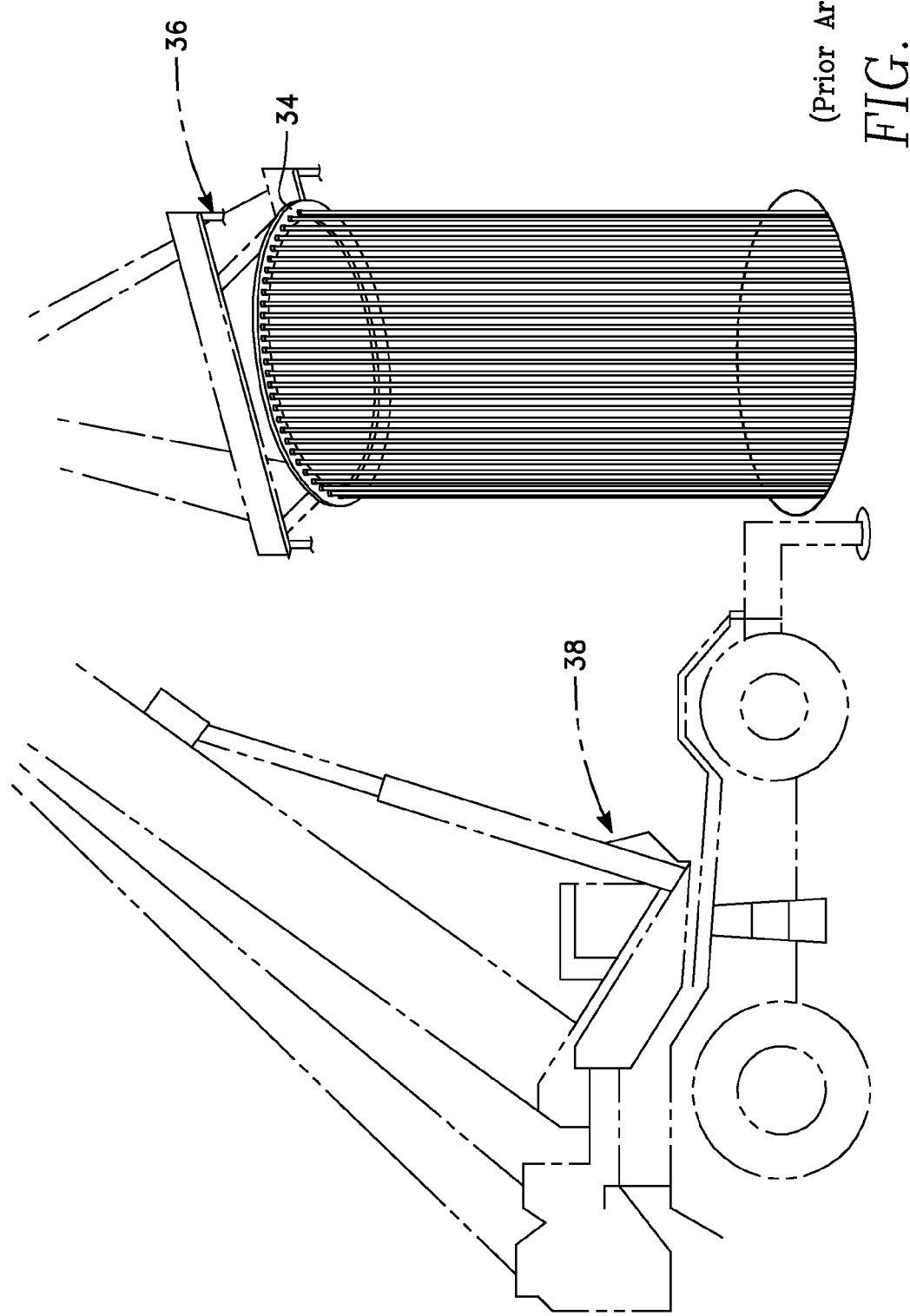
FIG. 3 shows the prior art method of placing the anchor bolts, where all of the anchor bolts are lowered into the borehole while suspended from the template.
Figure 4:
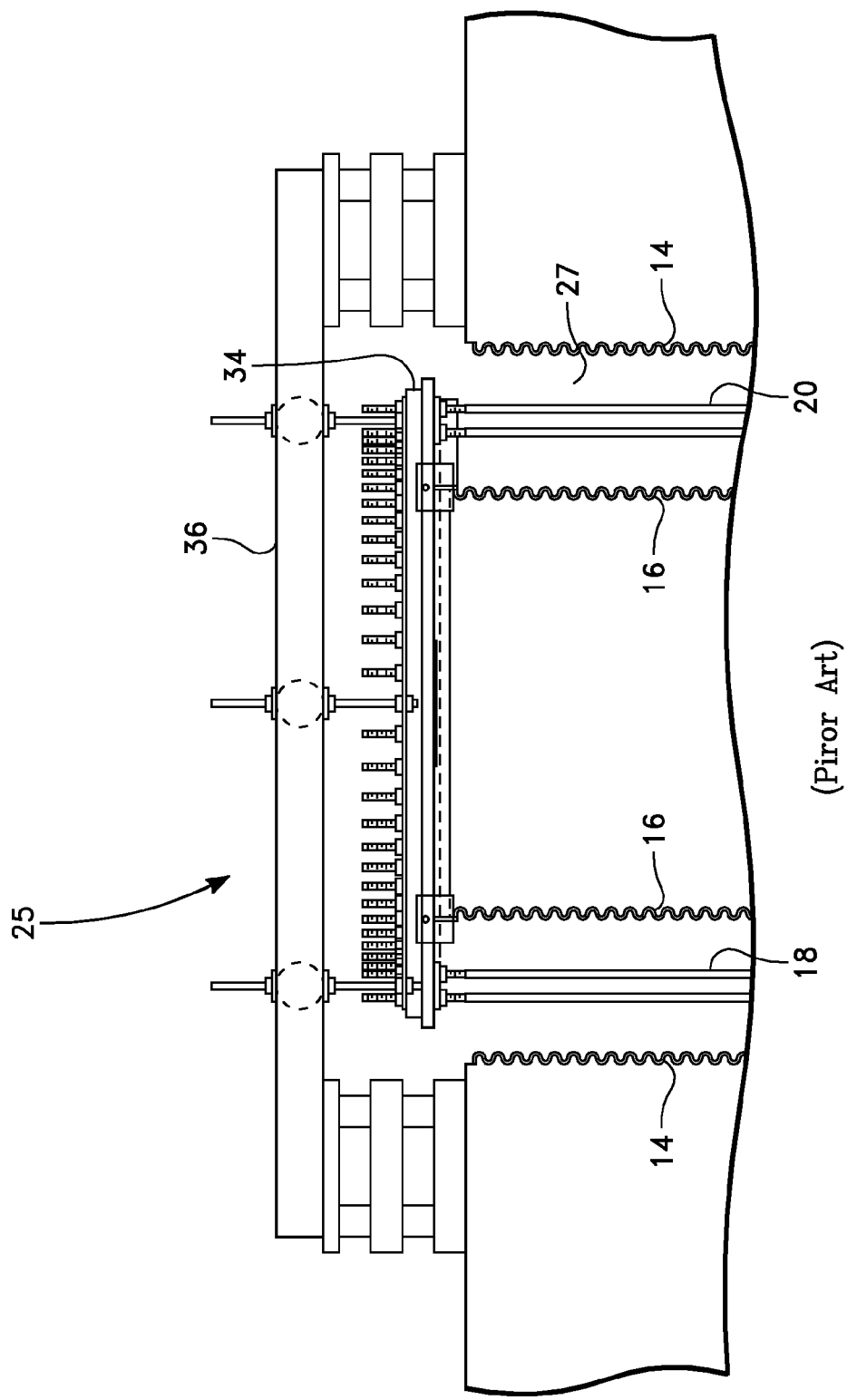
FIG. 4 shows a prior art jig assembly utilized to support the extremely heavy template for leveling the template.

FIG. 3 depicts the currently practiced method for obtaining the configurations depicted in FIGS. 1 and 2. As described above, a bolt assembly is formed by first lowering individual bolts 40 into bore hole 12, and then manually raising each bolt until it is attached to template 34. Once all of the bolts have been attached to template 34, the bolt assembly is lifted by a lifting assembly 36 connected to a high capacity crane 38. A jig assembly 25 is erected as generally depicted in FIG. 4 which suspends the lifting assembly 36, the grout template 34, and all anchor bolts within the bore hole. Once the bolts are in position, concrete is poured into the annulus 27 around the upwardly extending bolts, with the template 34 at the top of the bolts used to form a "grout trough" in the upper surface of the concrete. After the concrete cures, the grout template 34 must be freed from the concrete. This operation often requires the use of heavy hammers, pry bars, and a crane to break the grout template loose.

Figure 5:
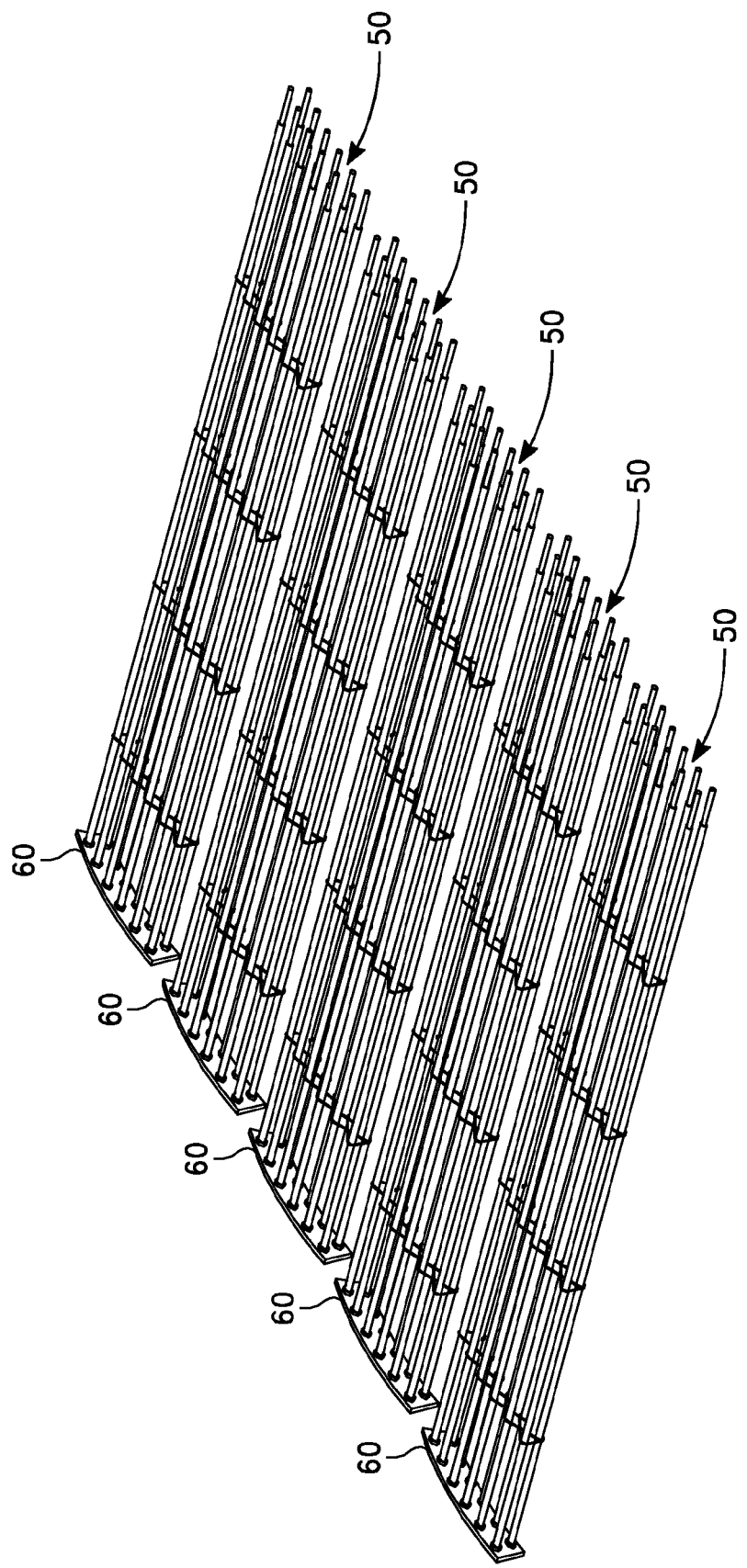
FIG. 5 shows a plurality of assembled bolt packages awaiting installation into the bore hole of a foundation.
Figure 6:
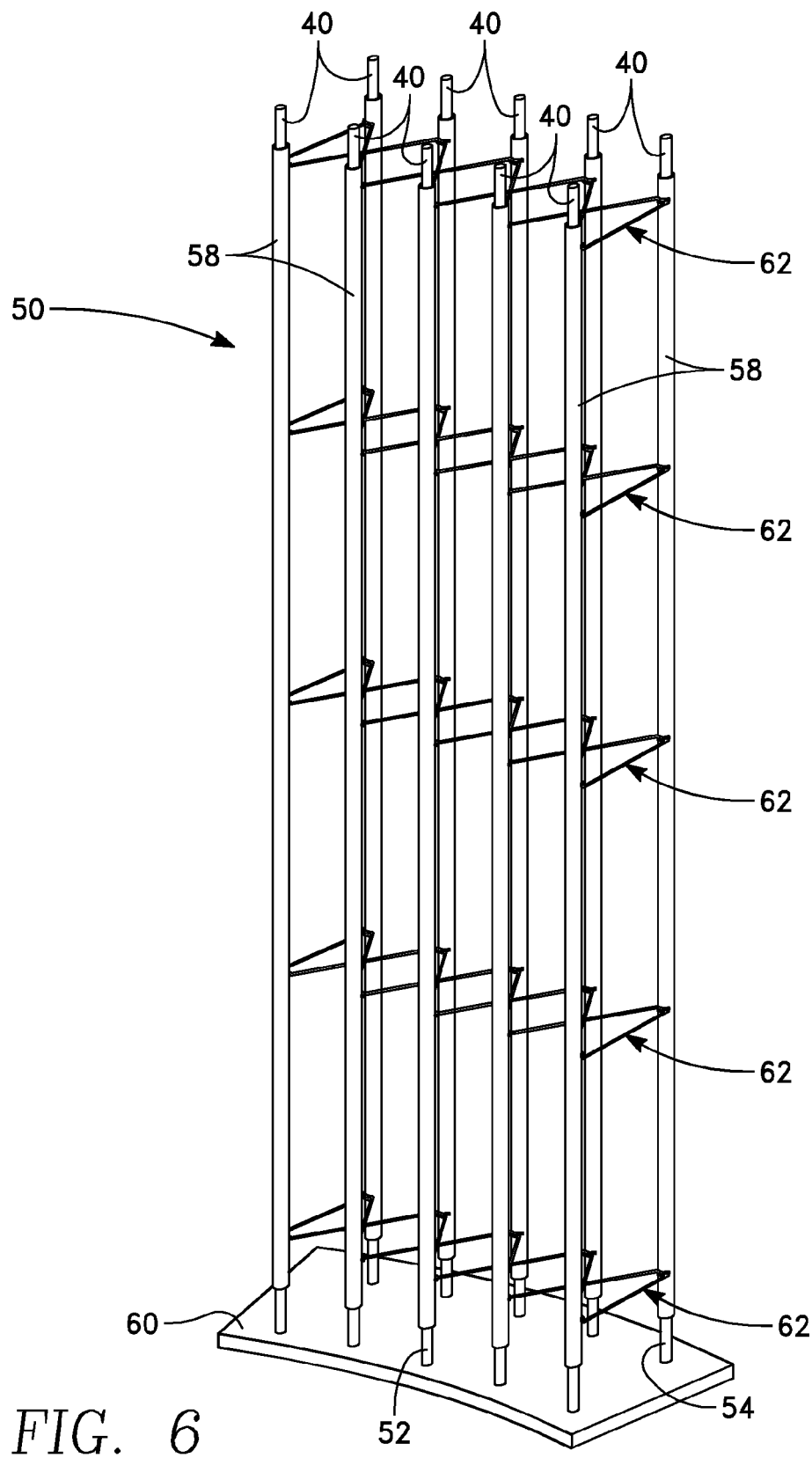
FIG. 6 depicts an embodiment of a bolt package in a vertical position as it would be when lowered into position.

The present invention is utilized to obtain the general configurations depicted in FIGS. 1 and 2 but largely avoiding the method depicted in FIG. 3 and the jig assembly 25 depicted in FIG. 4. As with the known method, a bore hole 12 is drilled and lined with outer boundary shell 14. However, rather than transferring bolt bundles into the bore hole and lifting each individual bolt 40 and inserting the bolt into template 34 according to the known method, the disclosed method utilizes prefabricated bolt packages 50 which are assembled outside of the bore hole 12 as depicted in FIG. 5 and as taught within the present inventor's U.S. Pat. No. 8,146,323, which is incorporated herein by this reference.

Figure 7:
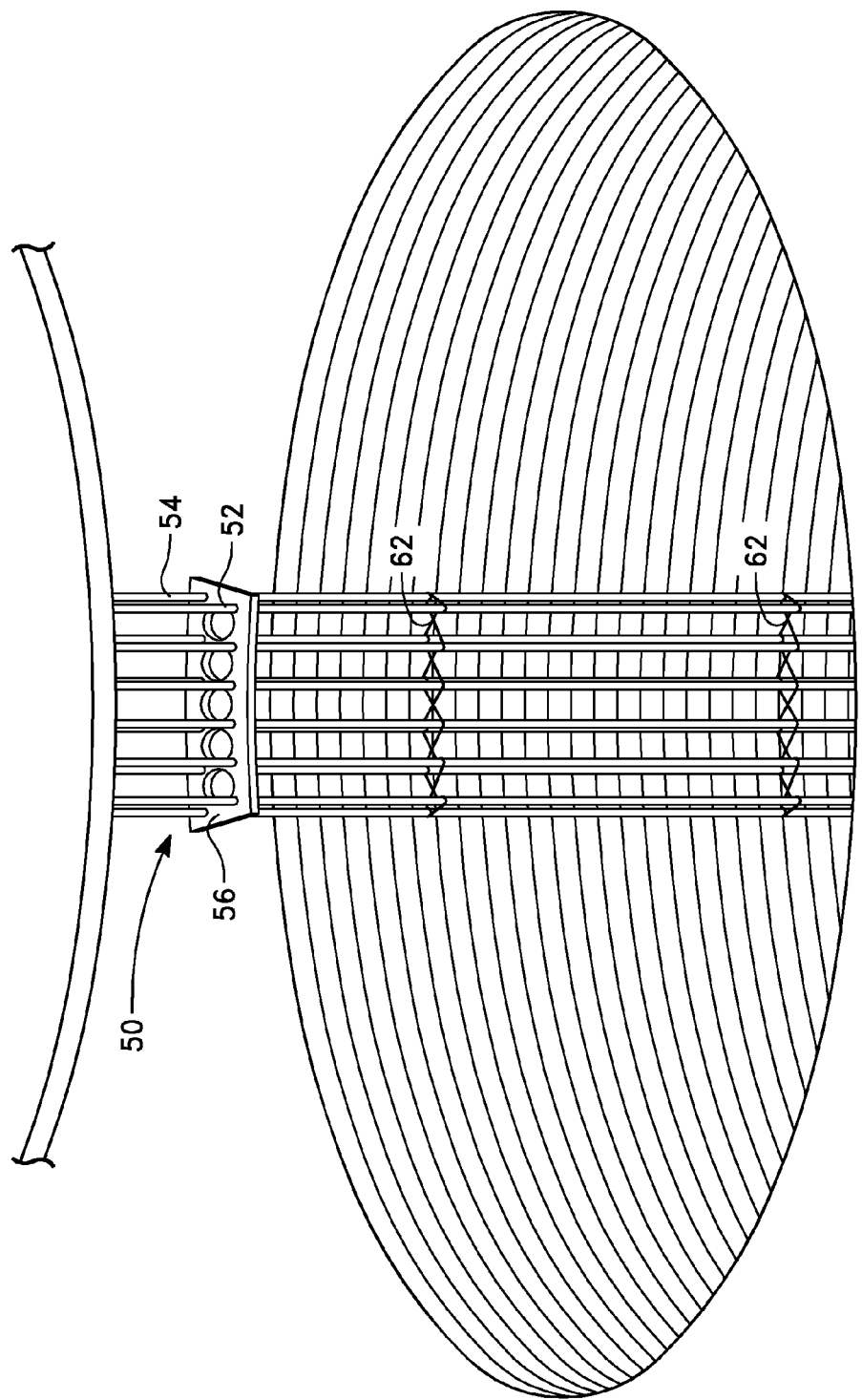
FIG. 7 depicts an embodiment of a bolt package being lowered into position within a bore hole.
Figure 8:
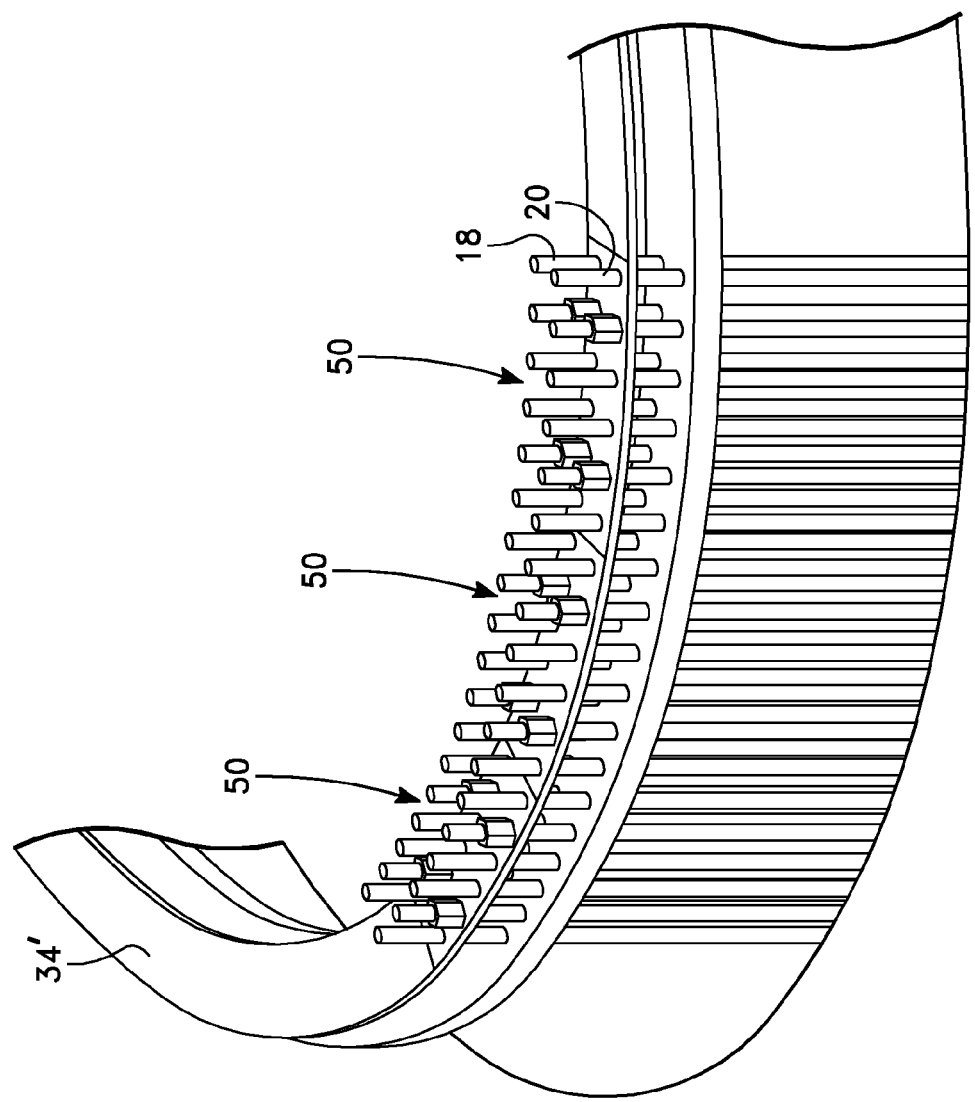
FIG. 8 shows the top of a borehole with several bolt packages installed.

In the method taught in the '323 patent, bolt packages 50 are formed by dividing the total number of anchor bolts 40 to be installed in the foundation bore hole into a plurality of groups. Each bolt package 50 is made up of a number of individual bolts 40. Typically, each bolt package 50 will have ten to twelve (and typically no more than twenty) individual bolts 40 which are placed in axial alignment with one another and are configured into an inner arc 52 and an outer arc 54 of bolts. Each bolt 40 in the bolt package 50 is retained in a fixed position with respect to the position of the adjacent bolts by fixing the position of each bolt by position retention means. The position of each bolt 40 within the bolt package 50, with respect to the adjacent bolts in the package, will be substantially the same position as when the bolt package is placed within the foundation bore hole 12 and when the bolt package 50 is placed in its final disposition within the foundation. Each bolt package 50 is thereafter lowered into the bore hole 12 and arranged such that the inner arc 52 of bolts 40 of each anchor bolt package form an inner circle 18 of upwardly facing anchor bolts and the outer arc 54 of each bolt package form an outer circle 20 of upwardly facing anchor bolts as indicated by FIGS. 7 and 8. As indicated by FIG. 7, a lifting plate 56 may be utilized for lifting and lowering the bolt package 50, but other means may also be utilized for lifting and lowering the bolt package as well, such that lifting plate 56 is optional. As described below, the lifting plate 56 may be replaced by a lifting bale 256 which is utilized together with the template sections described below.

Each bolt 40 contained within the bolt package 50 must be configured in such a manner as to allow tensioning of the bolt after it has been set in concrete 24. Usually this means each bolt 40 of the bolt package 50 will be contained within a bolt sleeve 58, where the bolt sleeves are typically elongated plastic tubes which encase the bolts substantially through the entire vertical extent of the concrete 24 and allow the bolts to be tensioned after the concrete has hardened and cured, thereby post-tensioning the entire concrete foundation. Alternatively, the bolts 40 can be wrapped in plastic tape, or coated with a suitable lubrication, which will allow the bolts to stretch under tension over the entire operating length of the bolt through the vertical extent of the concrete.

Each bolt package 50 further comprises an arc-shaped inbed plate 60 which is attached to what will be the downwardly facing ends of each bolt 40 when the bolt package is placed within the bore hole 12. A nut (not shown) is made up on each downward facing end of bolts 40 to attach the inbed plate 60 to the bolts. A lifting plate 56 or lifting bale 256 may be likewise attached to the upwardly facing ends of each bolt 40, with sufficient nuts made up on the upwardly facing ends of the bolts to adequately secure the lifting plate or lifting bale to the bolt package 50.

Figure 9:
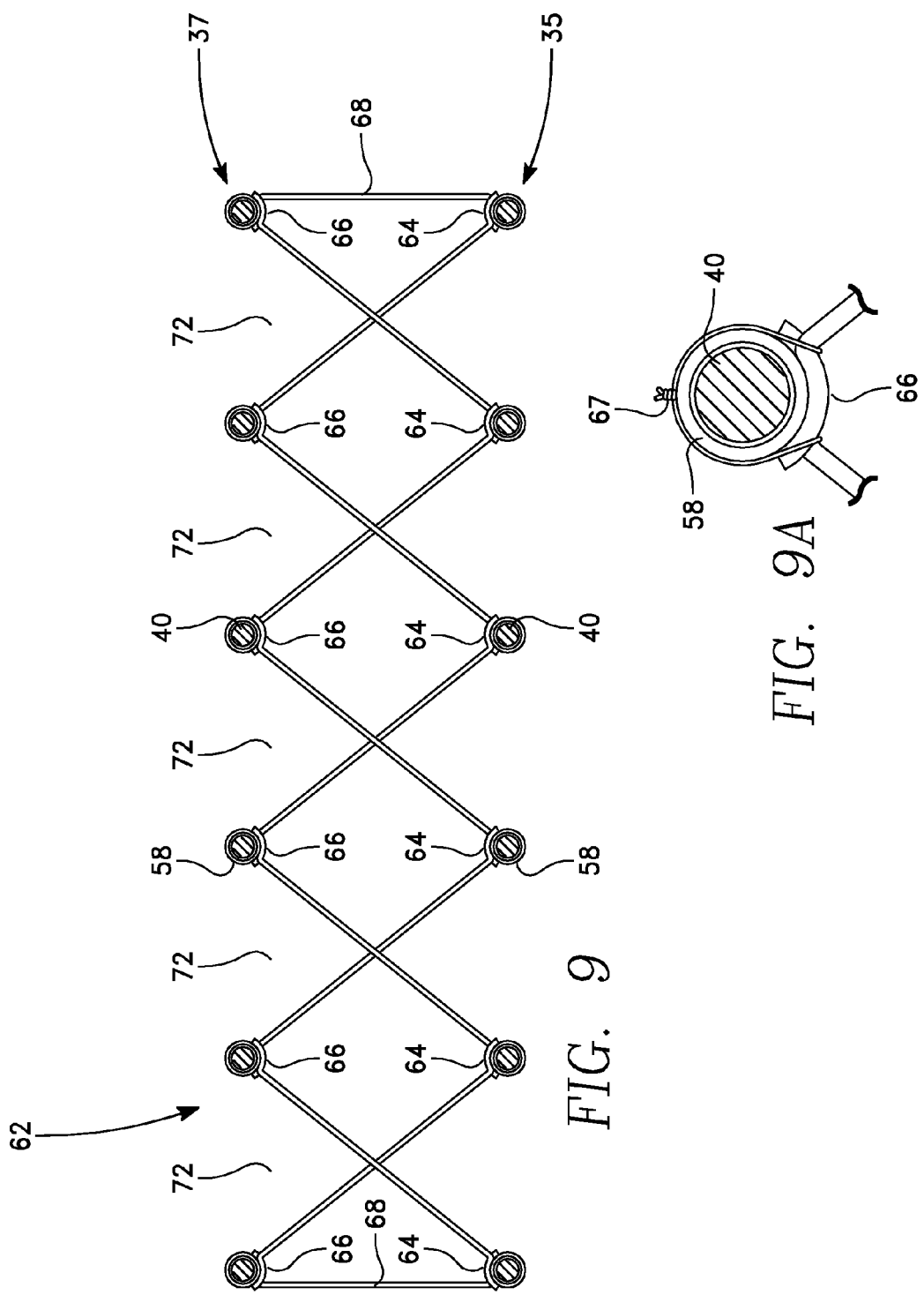
FIG. 9 schematically shows the configuration of one embodiment of a position retention means, referred to hereinafter as a "lattice assembly," utilized to maintain the bolts within a bolt package in position with respect to one another.
Figure 10:
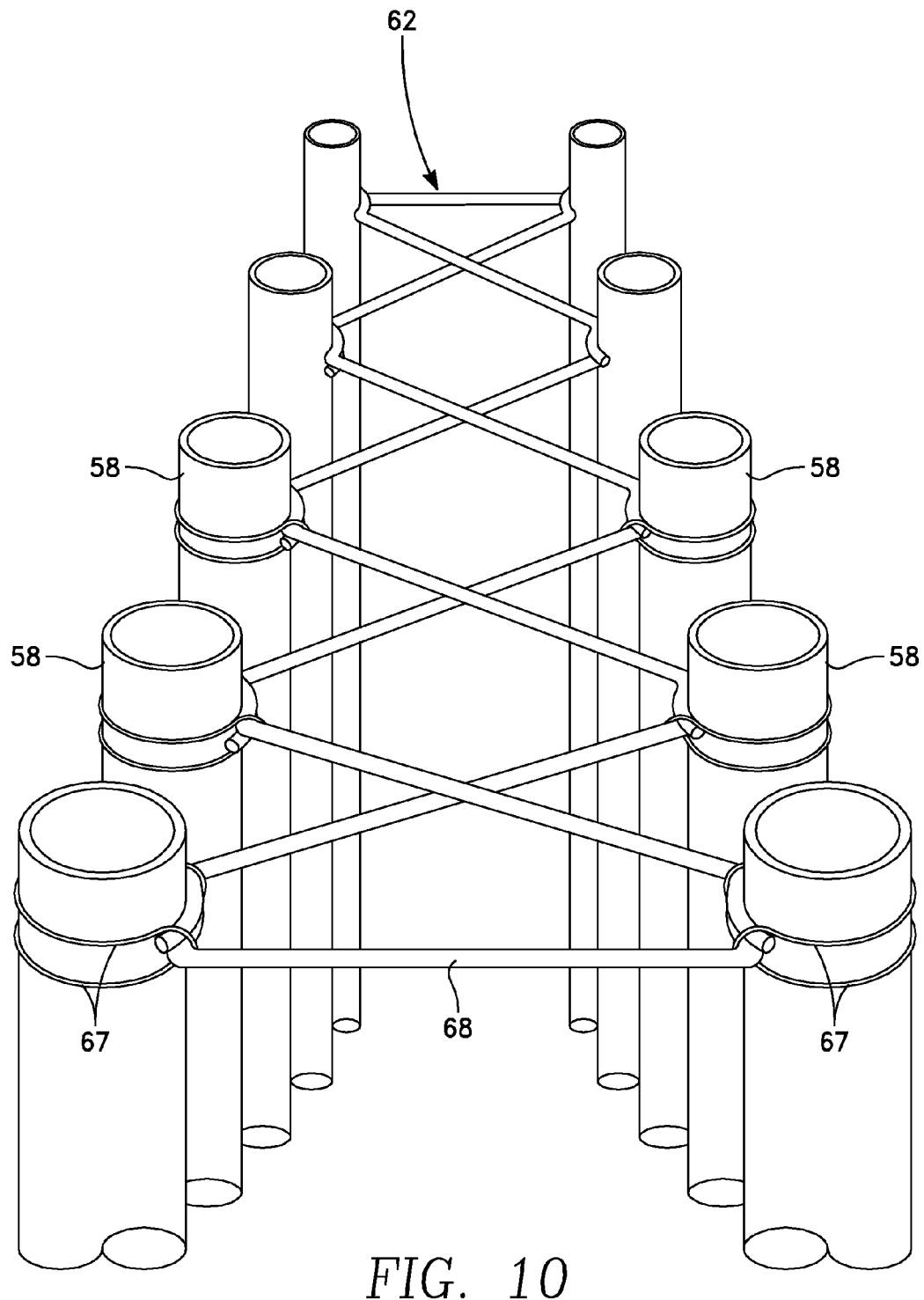
FIG. 10 shows a perspective view of an embodiment of a lattice assembly in accord with FIG. 9.
Figure 11:
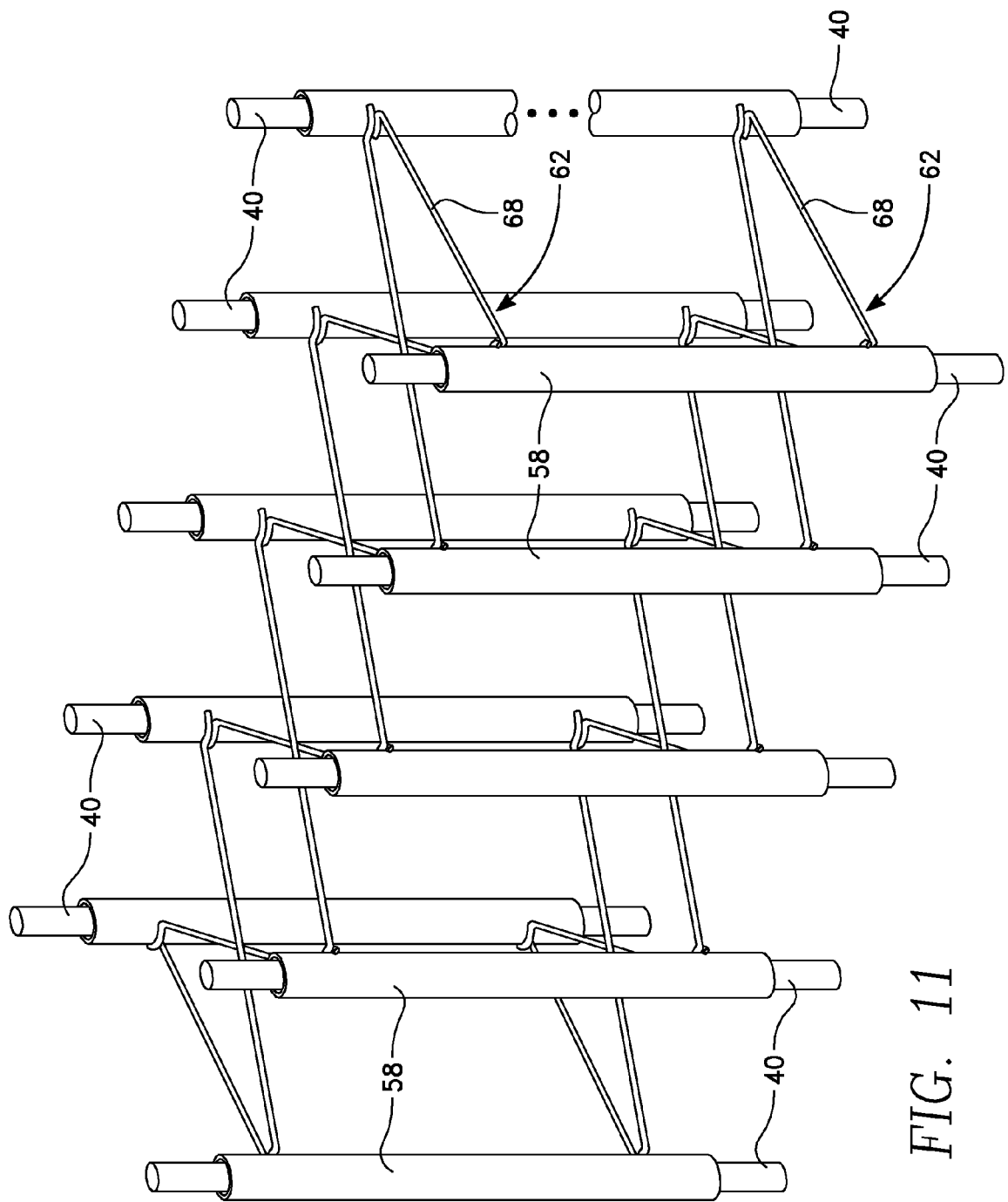
FIG. 11 shows the lattice assembly of FIG. 10 with bolts disposed within the bolt sleeves.

As further taught in the '323 patent, the bolt package 50 further comprises means for retaining the positions of each bolt 40 in the bolt package with respect to the other bolts in the bolt package as the bolt package is assembled and lowered into the bore hole 12. One such means for setting the relative positions of the bolts 40 in a bolt package comprises a plurality of lattice assemblies 62, each lattice assembly fabricated as generally depicted in FIGS. 9-11.

Figure 12:
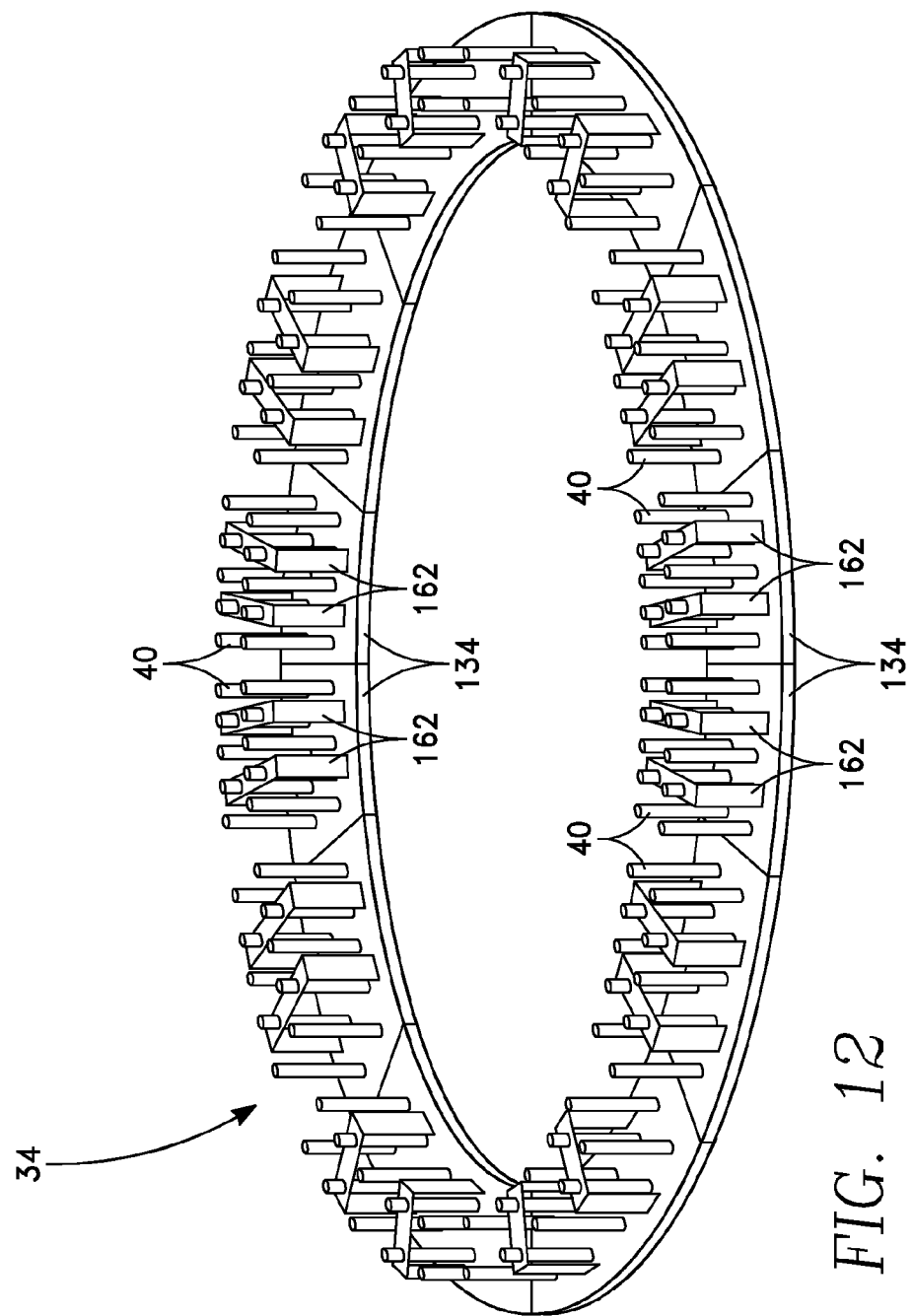
FIG. 12 shows an assembled grout template according to the present invention.
Figure 15:
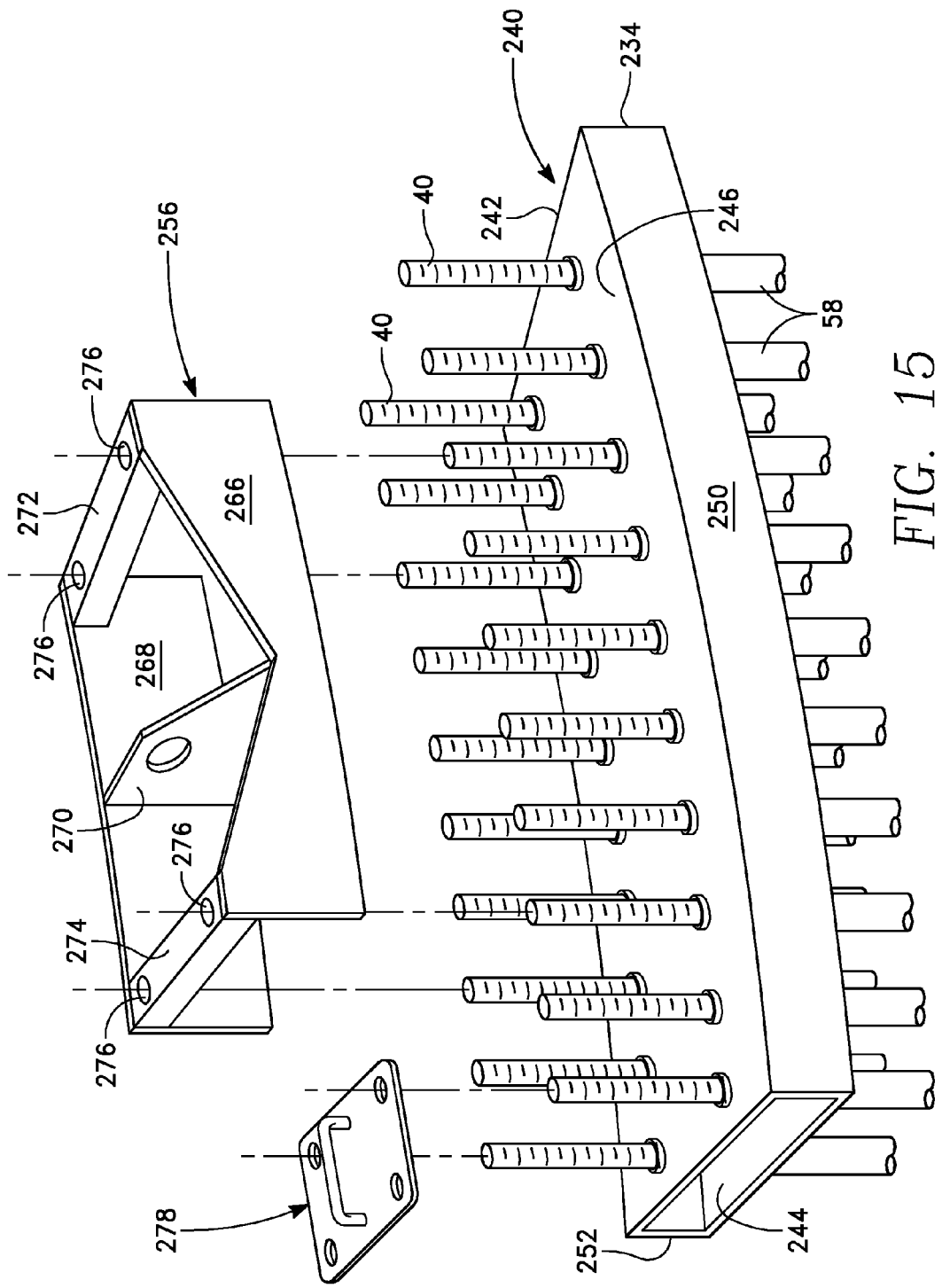
FIG. 15 shows an embodiment of an arch-shaped section of the grout template with an optional lifting bale and alignment plate.
Figure 16:
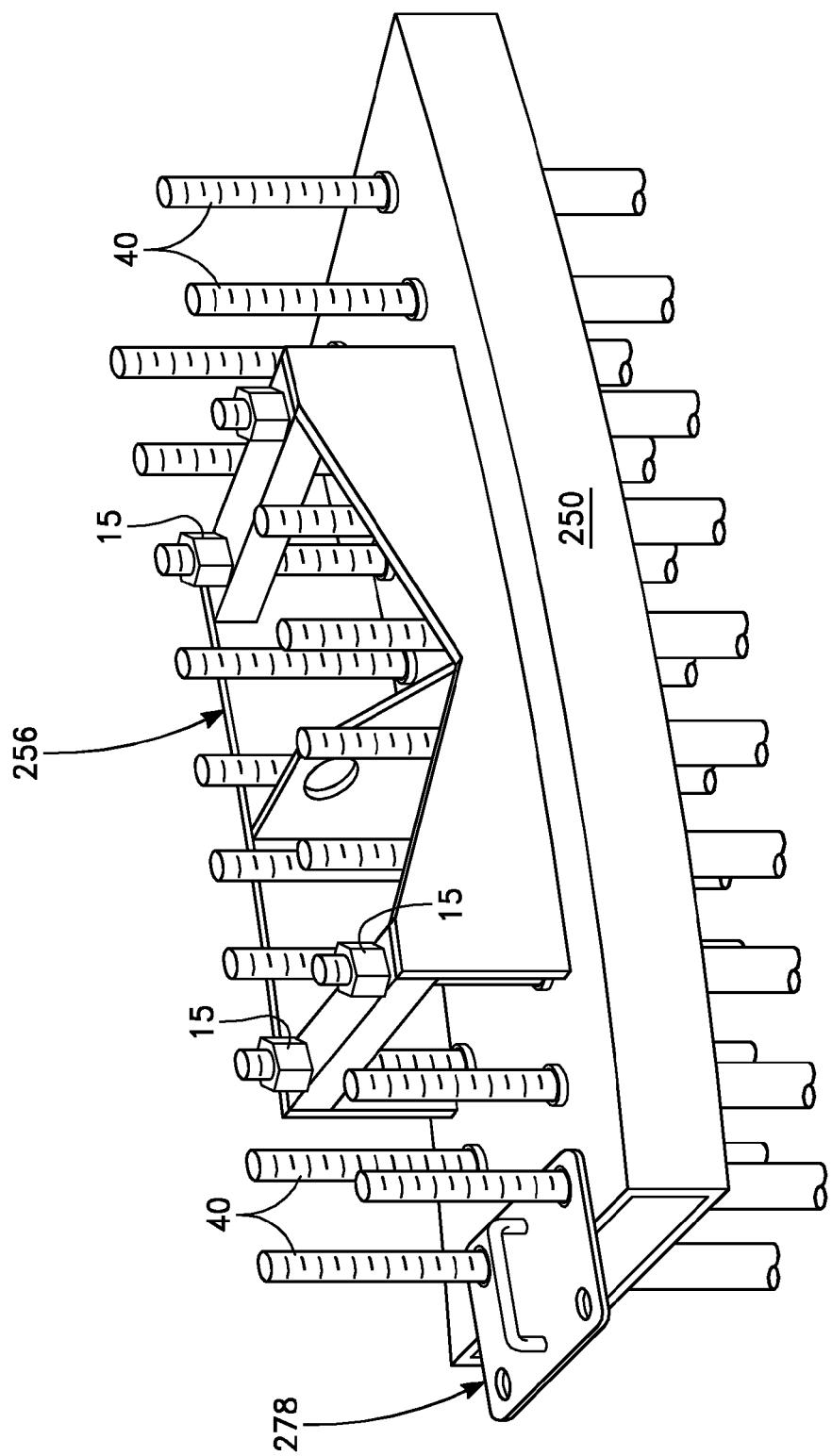
FIG. 16 shows the arc-shaped section of the grout template of FIG. 15 with the lifting bale and alignment plate attached.
Figure 20:
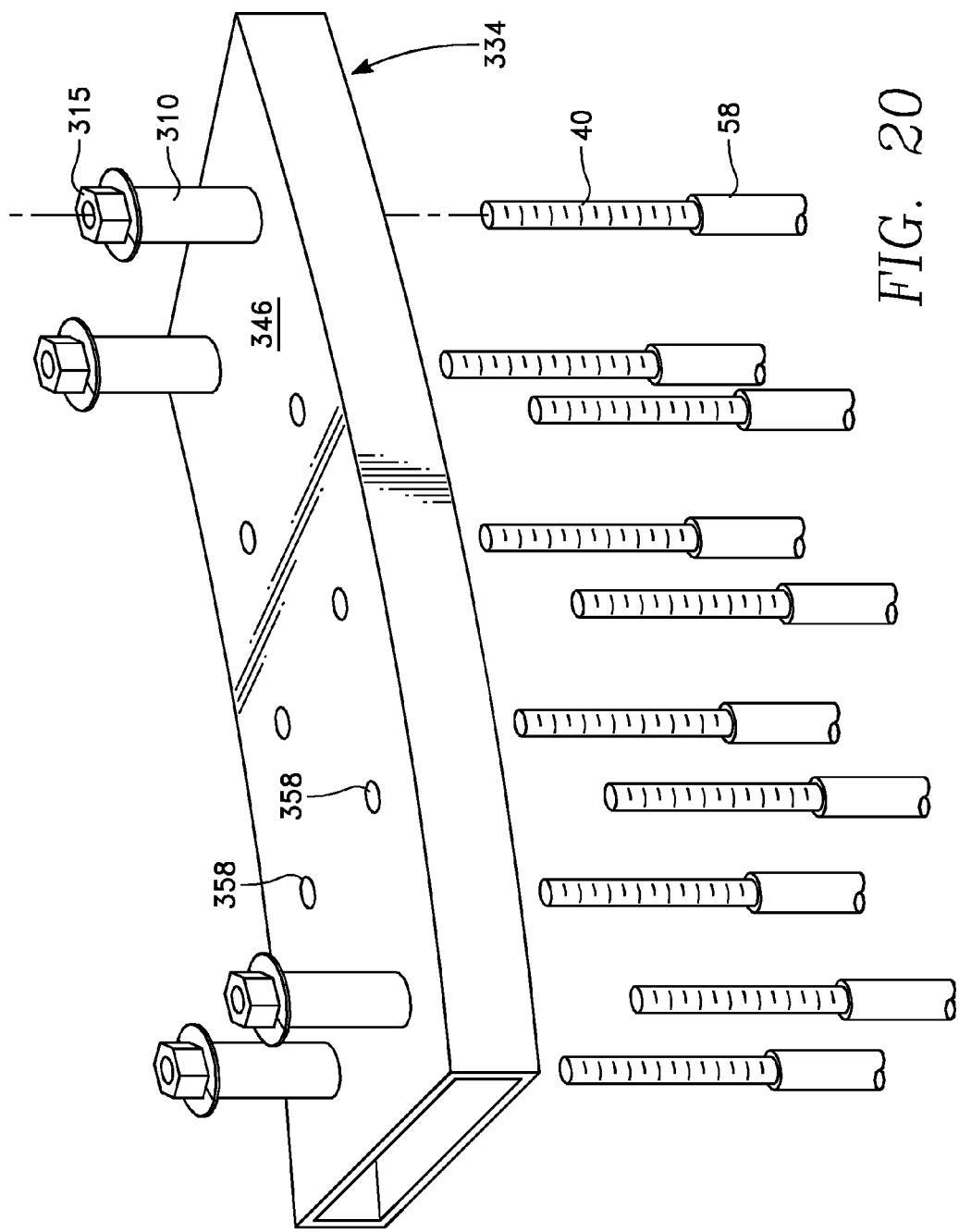
FIG. 20 shows an embodiment of the arc-shaped section of the grout template being placed on the upwardly facing ends of the anchor bolts of a foundation, showing how a nut is not required for every anchor bolt.
Figure 21:
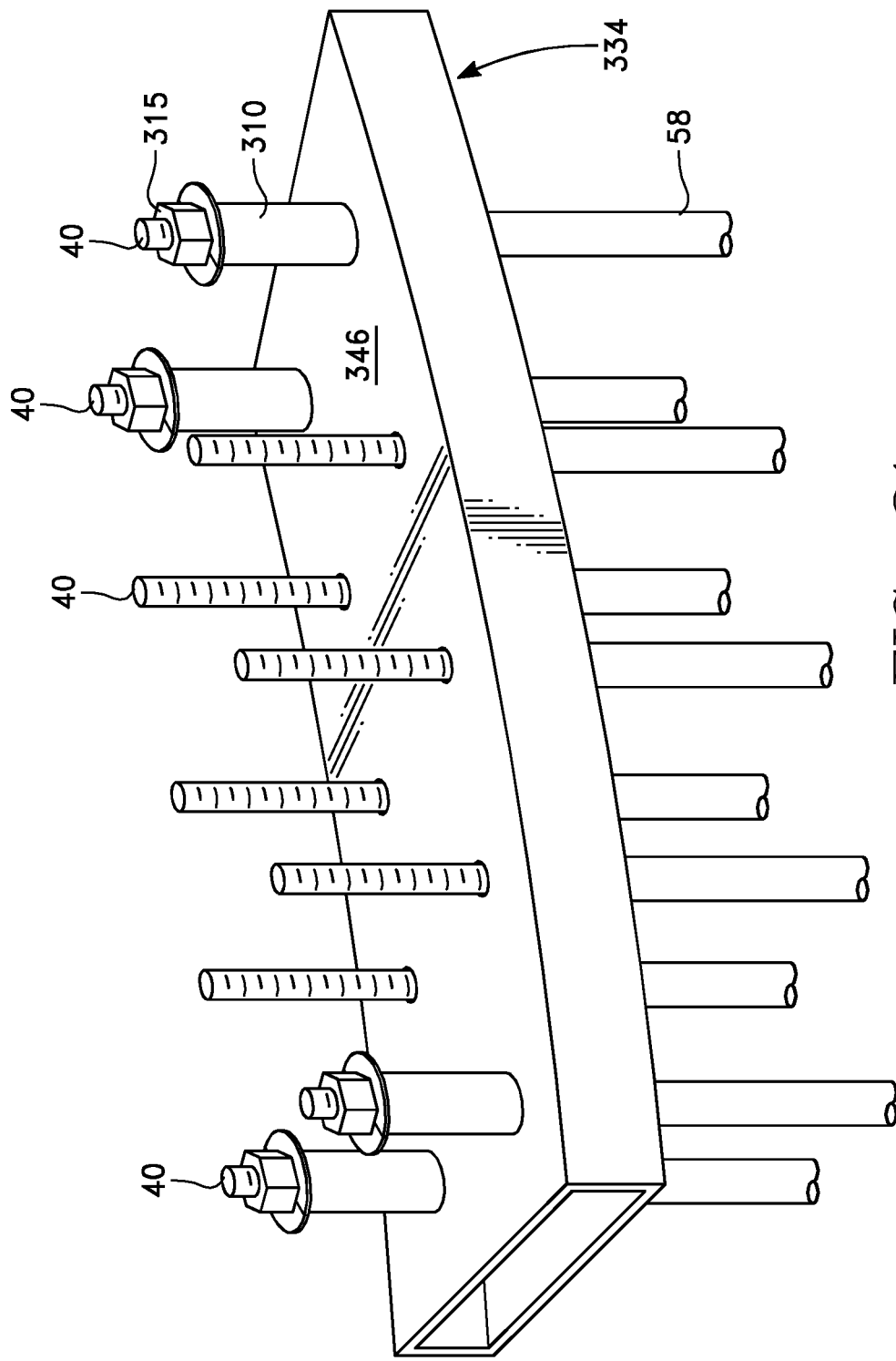
FIG. 21 shows an embodiment of the arc-shaped section of the grout template attached to selected anchor bolts.
Figure 22:
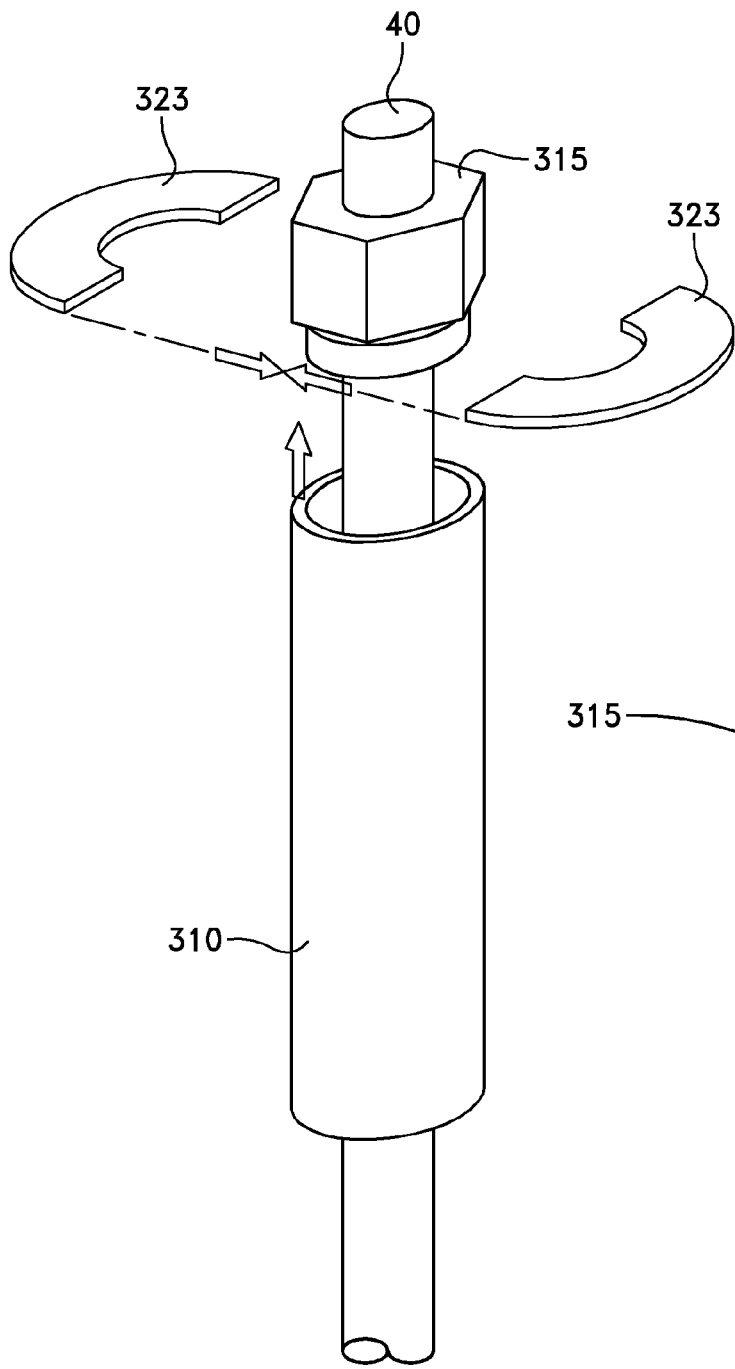
FIG. 22 shows how the split washer is utilized to attach the nut member to the spacer tube, but allowing the nut member to spin freely with respect to the spacer tube.
Figure 23:
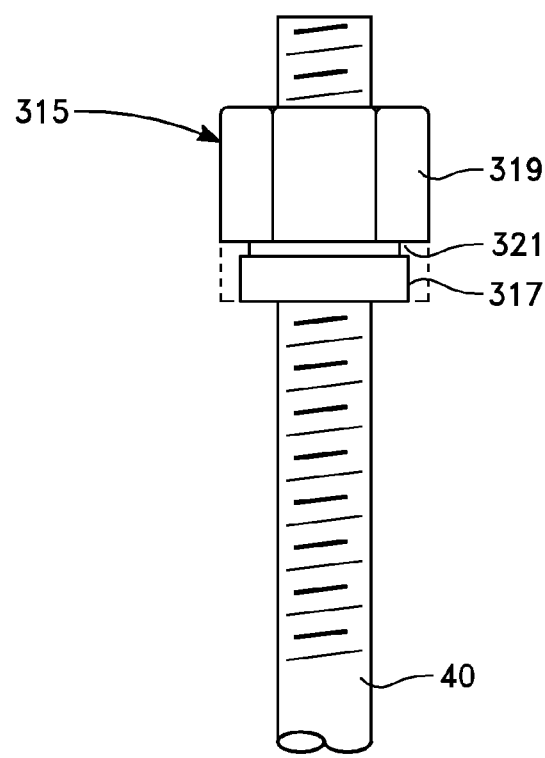
FIG. 23 shows a front view of a nut member.

Once all of the bolt packages 50 are installed within the bore hole 12, unless designed otherwise, the arcs of the adjacently positioned inbed plates 60 will form a complete circle forming the lower anchor ring, with each inbed plate of a bolt package attached to the inbed plates of the two adjacent bolt packages. In a similar manner, as best shown in FIGS. 8 and 12, arc-shaped sections 134 are connected to form template member 34'. The different embodiment of arc-shaped section 234, as depicted in FIGS. 15-16 or the embodiment of arc-shaped section 334 depicted in FIGS. 20-21 may alternatively used to form template member 34'.

Arc-shaped sections 134 comprise a unitary body 140 having a first end 142 and a second end 144 generally opposite first end 142. Unitary body 140 further comprises a top surface 146 which extends from the first end 142 to the second end 144 and a bottom surface 148 in opposite facing relation with the top surface, where the bottom surface also extends from the first end to the second end.

Figure 17:
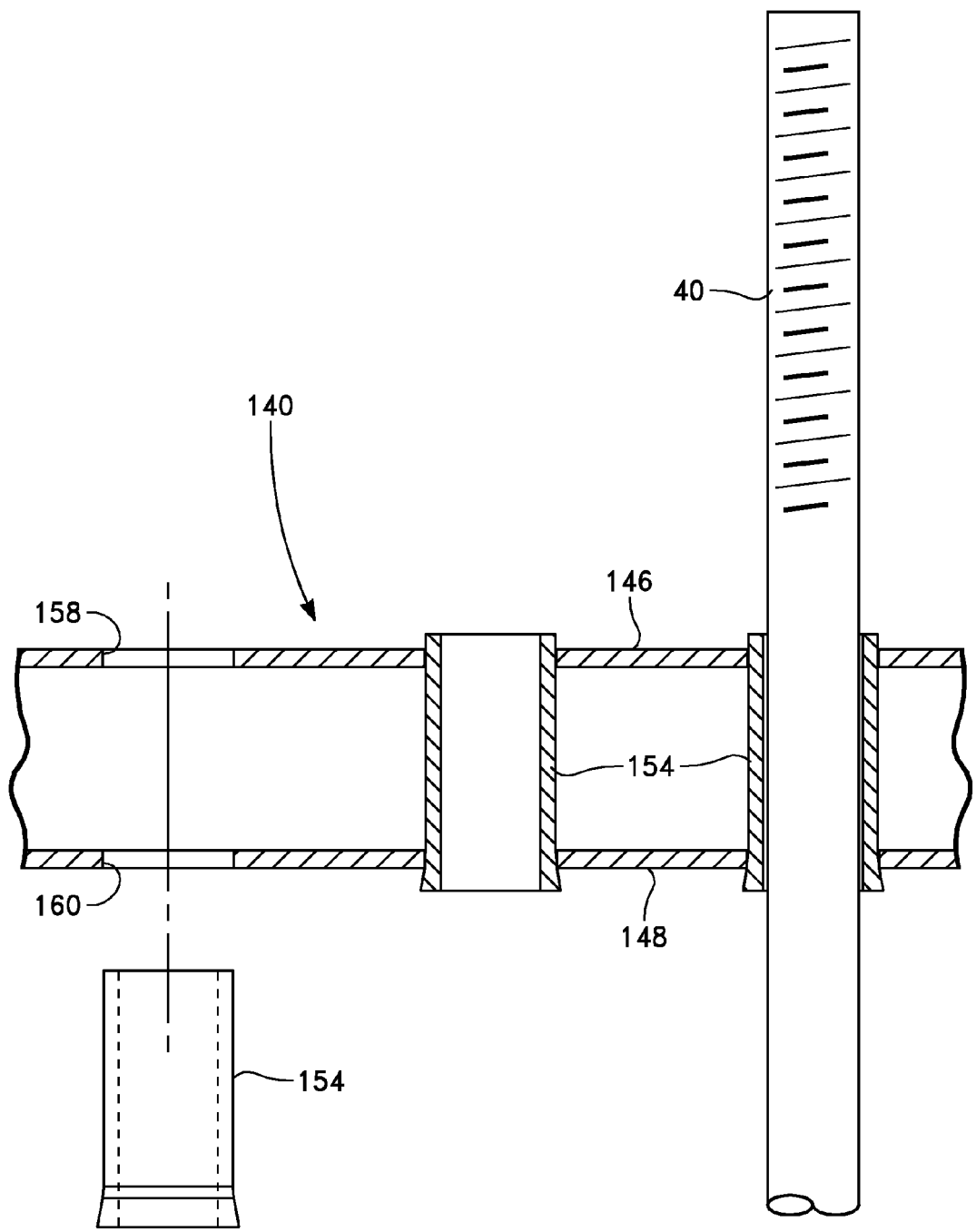
FIG. 17 shows how the grout templates of the present invention comprise may bushings for passage of the anchor bolts.
Figure 18:
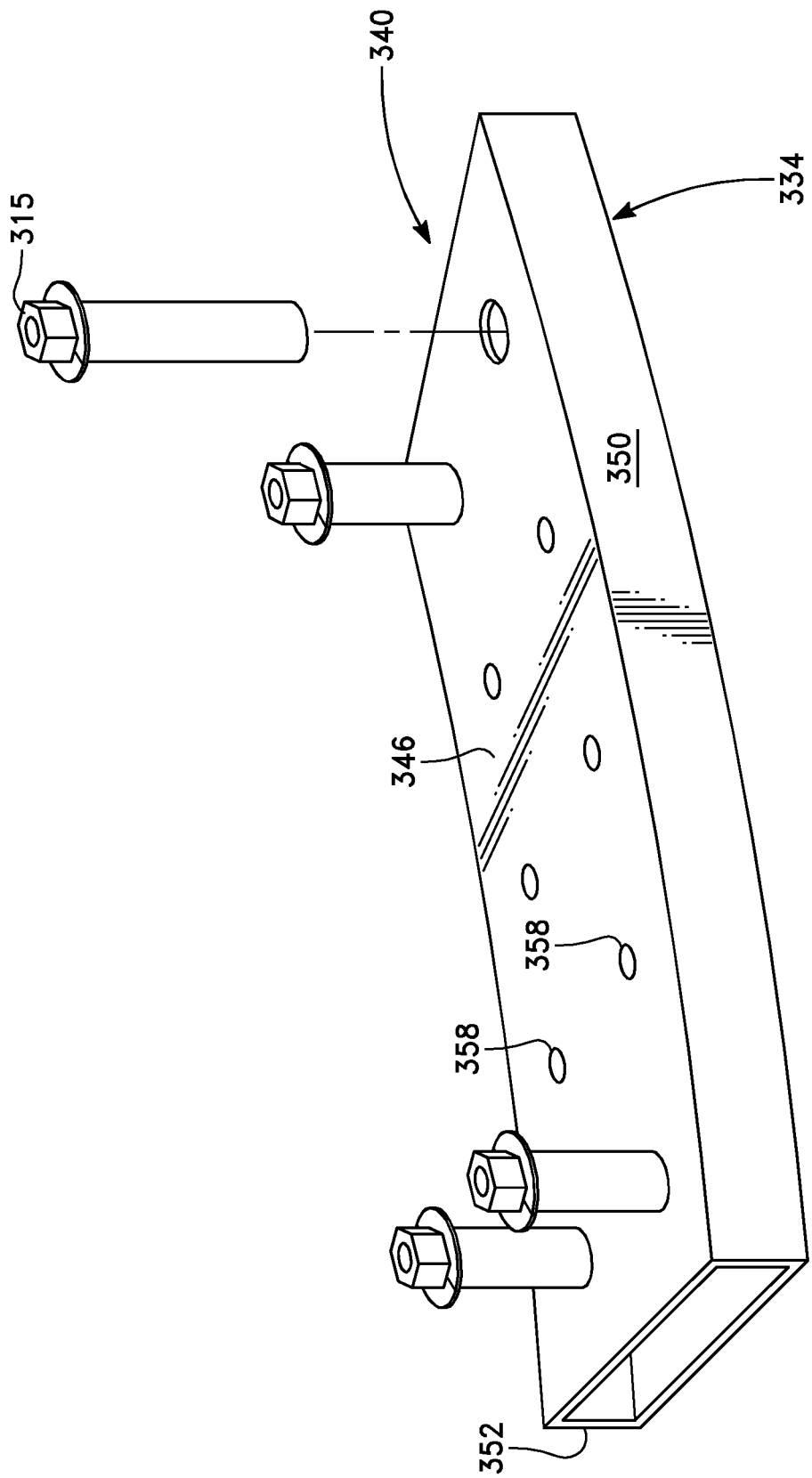
FIG. 18 shows another embodiment of an arc-shaped section of the grout template which utilizes a plurality of spacer tube-nut assemblies for lifting the section with respect to the anchor bolts.
Figure 19:
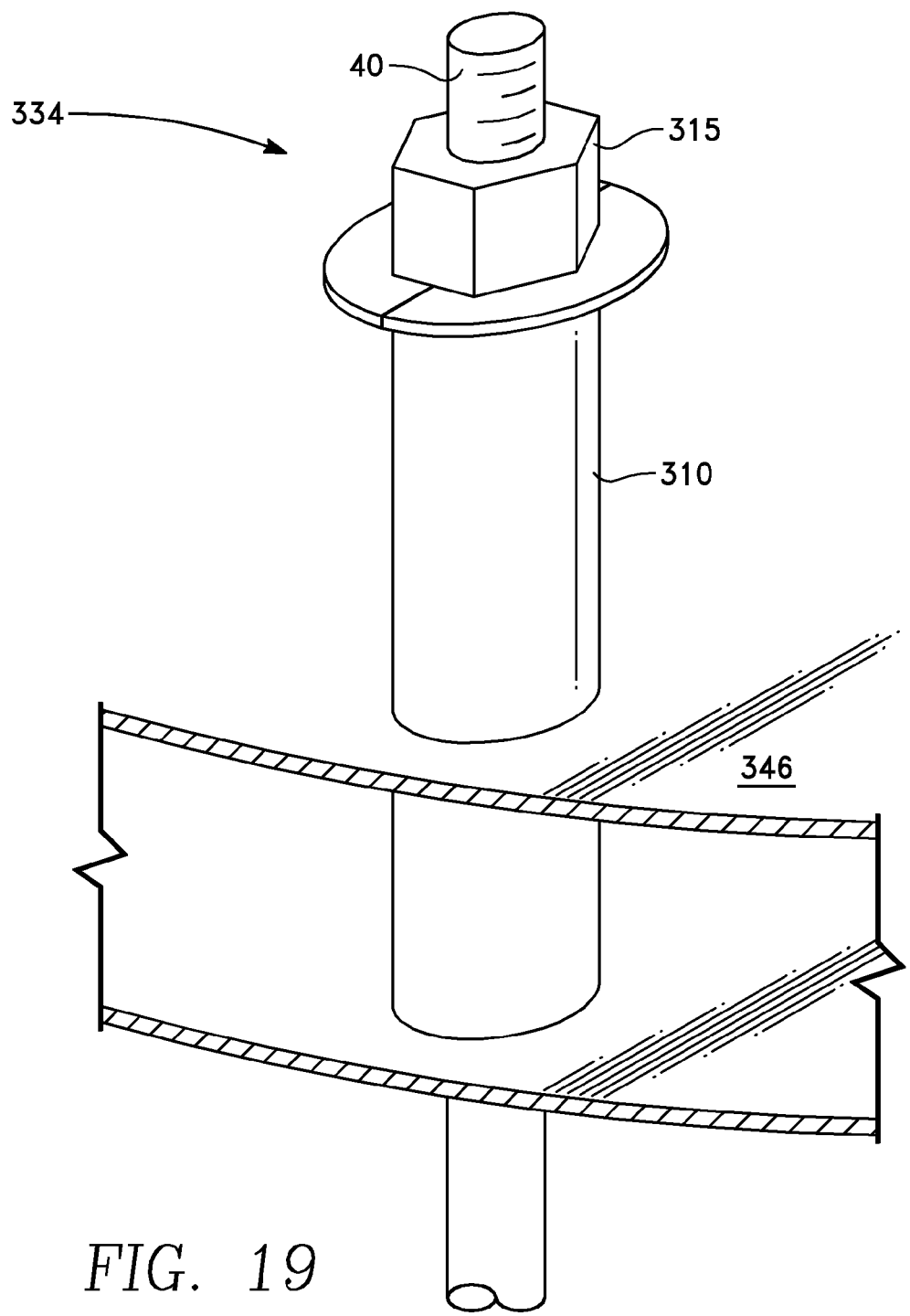
FIG. 19 shows a detailed view of a portion of the arc-shaped section for the embodiment shown in FIG. 18.

For arc-shaped sections 234, 334, unitary bodies 240, 340 may comprise a first longitudinal wall 250, 350 and a second opposing longitudinal wall 252, 352 which extend between the first ends 242, 342 and second ends 244, 344. However, as shown in FIG. 17, the unitary body 140 may simply comprise opposite facing top surface 146 and bottom surface 148 which are connected by interior bushing sleeves 154. The surfaces of arc-shaped sections 134, 234, 334 may be coated with polytetrafluoroethylene such as, for example, Teflon® to prevent adherence to the concrete.

The unitary body 140, 240, 340 further comprises at least two adjacent openings 158, 258, 358 in the top surface 146, 246, 346 and at least two adjacent openings 160, 260, 360 in the bottom surface 148, 248, 348 where the openings in the top surface align with the openings in the bottom surface. These openings, into which interior bushing sleeves 154 are typically pressed as depicted in FIG. 17, are sized and shaped to receive an end of an anchor bolt 40.

Figure 13:
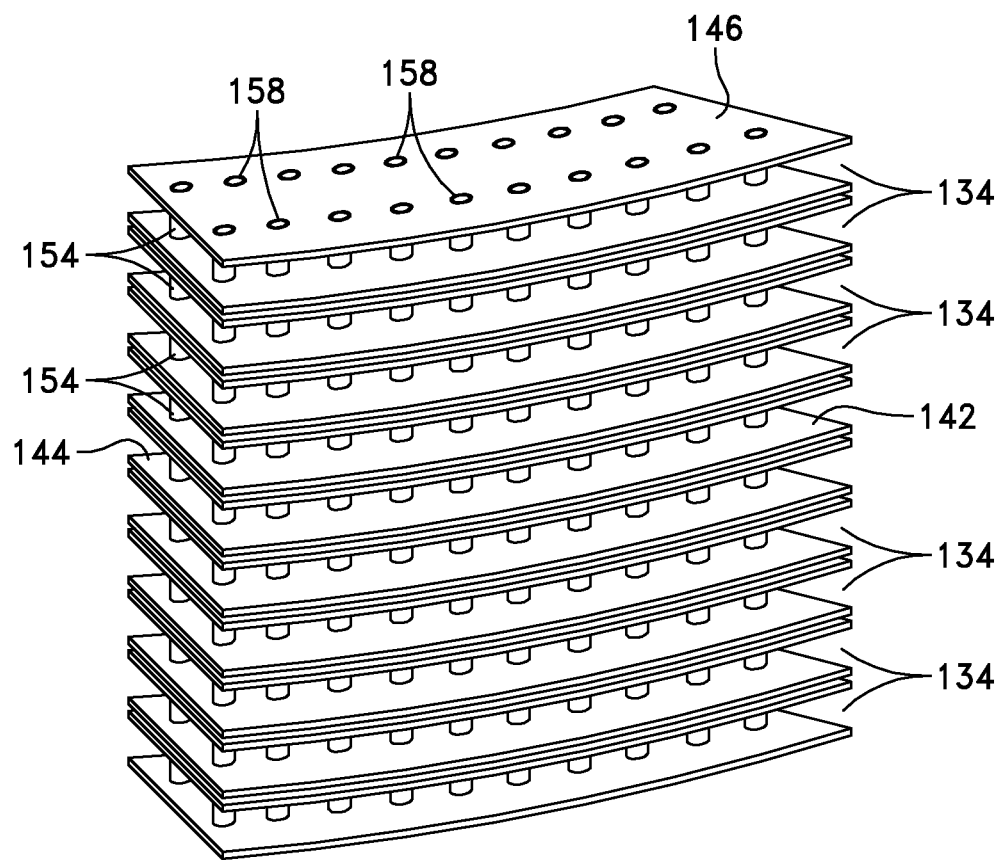
FIG. 13 shows how a plurality of the arc-shaped sections of the grout template may be stacked for transportation or storage.
Figure 14:
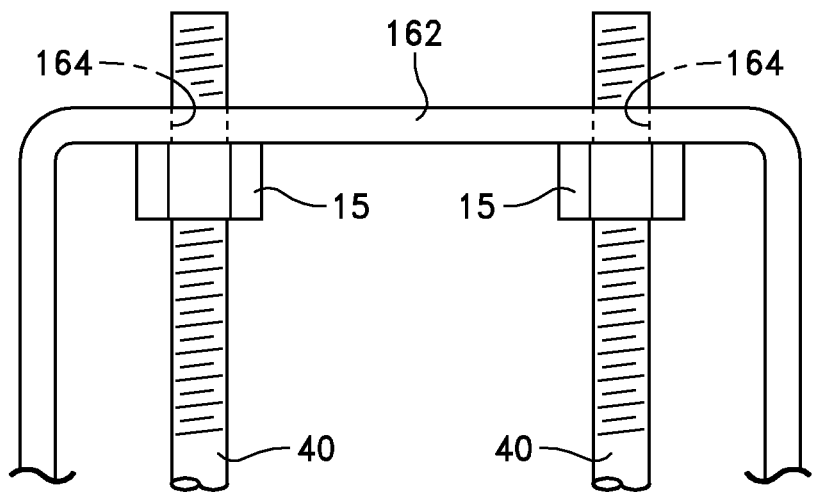
FIG. 14 shows a lifting bracket which may be utilized as a means of lifting the arc-shaped section from the concrete surface.

FIG. 12 depicts a surface view (without showing any of the foundation below the surface) of a grout template 34' which has been assembled with a plurality of arc-shaped sections 134 (arc-shaped sections 234 and 334 may likewise be used). FIG. 13 depicts the arc-shaped sections 134 in an unassembled configuration. FIG. 13 shows how, in marked contrast to the extremely heavy grout template 34 utilized in the known method, the arc-shaped sections 134 are stackable, relatively light weight, and easily transported. FIG. 14 depicts a bracket 162 which attaches to the top surface 146 of arc-shaped section 134. The bracket 162 has openings 164 which are aligned and in facing relationship with the openings 158 in the unitary body 140. Bracket 162 may be utilized to lift the arc-shaped section 134 from the cured concrete below the template by turning nuts 15 such that the nuts move upwardly on the anchor bolts 40, thereby lifting bracket 162 and the attached arc-shaped section 134 from engagement with the cured concrete. This lifting mechanism, combined with the great difference in weight between the individual arc-shaped section 134 and the grout template 34 of the known method, greatly facilitates the separation of a grout template 34' fabricated from the individual arc-shaped sections as compared to the grout template 34 of the known method.

FIG. 15 depicts an exploded view of arc-shaped section 234. This embodiment of the template sections comprises a lifting bale 256. As discussed above, lifting bale 256 may be utilized for lifting an entire bolt package 50. Unlike the arc-shaped sections 134, 234, 334 which may be fabricated from relatively light materials such as aluminum, lifting bale 256 is fabricated from structural steel members comprising side members 266, 268, lifting member 270 and cross-members 272, 274. When lifting bale 256 is utilized to lift a bolt package 50, bolts 40 are inserted through eight different apertures 276 which are positioned within the different structural steel members of the lifting bale, with a nut 15 securing each bolt to the lifting bale. With this configuration, the bolt package 50 is lifted by the lifting bale 256 rather than the arc-shaped section 234.

As shown in FIGS. 15-16, arc-shaped section 234 may comprise alignment plate 278 which secures the arc-shaped section to adjacent sections. While note shown with arc-shaped sections 134, 334, alignment plate 278 may be used with these embodiments as well. The alignment plate 278 insures that the grout template 34' is firmly secured in place and maintaining the bolts 40 in position before the pouring of the concrete around the bolts. Once the concrete cures, arc-shaped section 234 may be lifted from the concrete by turning nuts (not shown) on anchor bolts 40, where the nuts are located beneath cross-members 272, 274 in the same manner as discussed above for the embodiment without the lifting bale.

FIGS. 18 through 23 depict an embodiment of arc-shaped section 334 which employs a different mechanism for lifting the arc-shaped section 334 from the cured concrete. With this embodiment, a nut assembly 315 is utilized which facilitates rotation of the nut because the nut is within easy reach rather than beneath a bracket or steel frame as with the other embodiments. In this embodiment, the arc-shaped section 334 comprises a plurality of spacer tube-nut assemblies, such as four assemblies per arc-shaped section. The spacer tube 310 is welded to the top surface 346 of the arc-shaped section 334. Each nut assembly 315 comprises a bushing member 317 depending from a nut body 319, where the bushing member comprises a slot 321. A sectioned washer 323 or comparable structure is thereafter utilized to attach the nut assembly 315 to the spacer tube 310, which allows the nut assembly 315 to spin with respect to the spacer tube. The spacer tube-nut assemblies fit over some of the upwardly facing anchor bolts 40.

While the above is a description of various embodiments of the present invention, further modifications may be employed without departing from the spirit and scope of the present invention. Thus the scope of the invention should not be limited according to these factors, but according to the following appended claims.

What is claimed is:

1. A template section which, in combination with adjacent template sections, forms a trough in a cement substrate, the template section comprising:
 a unitary body comprising:
  first and second opposing ends;
  a top surface extending from the first end to the second end;

a bottom surface extending from the first end to the second end in opposite facing relation with the top surface, with a space defined therebetween; and a lifting bale fixedly attached to the template section, the lifting bale comprising a frame defining at least one opening therein for grasping the lifting bale, the lifting bale comprising lifting members comprising apertures for receiving the ends of a plurality of anchor bolts, wherein the unitary body further comprises at least two adjacent openings in the top surface thereof, and at least two adjacent openings in the bottom surface thereof, the openings in the top surface aligned with the openings in the bottom surface, the openings in the top surface and the bottom surface sized and shaped to receive an end of a wind turbine foundation anchor bolt therein, and further wherein when in operative position in a cement substrate and having a turbine foundation anchor bolt received through one of said openings in the top surface and one of said openings in the bottom surface, the unitary body is oriented such that the turbine foundation anchor bolt is maintained in a vertical position and a trough is formed in the cement substrate by the bottom surface of the unitary body.

\* \* \* \* \*